Patented May 19, 1953

2,639,225

UNITED STATES PATENT OFFICE 2,639,225

FURNACE BLACK PELLETIZING PROCESS

Louis Joseph Venuto, Bayside, N. Y., assignor to Columbian Carbon Company, New York, N. Y., a corporation of Delaware No Drawing. Application August 31, 1946, Serial No. 694,410

6 Claims. (Cl. 23—314)

This invention relates to improvements in the process of converting loose furnace blacks to the pelleted or aggregated form, with the production of a pelleted product in which the pellets have sufficient strength to permit bulk handling and yet are sufficiently soft to permit ready dispersion in rubber or the like.

Channel carbon blacks are commonly converted, for shipping and other purposes, from the flocculent loose form in which they are produced to a pelleted form, and are shipped and stored in bulk, i. e., are shipped in tank cars, and handled in mechanical or other conveyors and stored in storage bins with gravity or other type of feed to the point of use. Various methods for the conversion of the flocculent channel black to the pelleted form are used, including the so-called single liquid method of the Glaxner Patent Re. 21,379, and the dry methods, such as those described in the Billings et al. Patent Re. 19,750 and the Price patent 2,127,137. With channel black, it is relatively simple to produce a pelleted product having the requisite strength for handling in bulk without undue disintegration of the pellets with formation of dust or fines or loss of their free-flowing characteristics which are necessary for bulk handling.

With the furnace blacks, however, these processes, successful for the conversion of the flocculent channel black to the pelleted form, do not result in a pelleted product having the requisite strength for bulk handling. The furnace blacks are commonly converted to a pelleted form by one or the other of these processes partly to increase their apparent density and partly because if handled with some gentleness, they retain their form and the dusting incidental to the handling of the black is somewhat reduced. Also, in this form it is more convenient to measure the quantities used. However, because of the weakness of the pelleted structures produced by these processes from furnace blacks, the pelleted furnace blacks cannot be handled by the bulk systems now in use, and cannot be shipped in tank cars. Thus if an attempt be made to ship a pelleted furnace black prepared by one of the common methods in a tank car, the disintegration or loss of the free-flowing characteristics of the pellets during the shipping period is such that the product will not flow from the bottom of the car as is required in discharging the car at the point of use, nor handle satisfactorily in subsequent mechanical handling systems.

The present invention provides an improved process for the conversion of flocculent furnace blacks to the pelleted form which result in a pelleted free-flowing product having the necessary strength to permit handling in bulk, the pelleted product thus having the advantages of dustlessness and capacity for handling and shipping in bulk characteristic of the pelleted channel blacks commonly produced.

The carbon blacks herein referred to as impingement or channel blacks are those which are made by burning a hydrocarbon in a zone to which there is supplied an amount of air insufficient for complete combustion of the hydrocarbon and causing the resultant flame to impinge upon a metallic surface upon which the black is deposited and from which it is collected. It is customary to use channel iron as the depositing surface, hence the name channel blacks.

As distinguished from impingement blacks, the blacks herein designated furnace blacks are made by burning a hydrocarbon in a chamber or furnace with an amount of air insufficient for complete combustion, and separating the carbon black from the furnace effluent gases. This general classification of furnace blacks as used herein also includes blacks formed by thermally decomposing a hydrocarbon by admixing it with hot gases or passing it in contact with highly heated surfaces.

The designation "furnace blacks," as used hereein and in the accompanying claims, is intended to include all blacks of the type produced by such furnace methods, not excluding the so-called lamp blacks.

The characteristics of these two types of carbon black, that is impingement or channel blacks and the furnace blacks, differ in a number of respects. The furnace blacks are generally of somewhat larger particle size than the impingement blacks, also they generally contain a relatively larger proportion of oily matter.

As previously noted, satisfactory pellets capable of bulk handling may be readily prepared from channel black by agitating the black with a restricted amount of water, the amount of water varying somewhat with the particular black. However, furnace blacks pellets capable of bulk handling do not normally result from such treatment.

I cannot at present account for this different behavior of impingement blacks and furnace blacks. It may be due to a difference in particle size, a difference in oiliness, or a combination of both, or it may be due in part, at least, to other differences in these two types of black.

I have found, however, that by including in the water, with which the black is agitated, a minor amount of a surface active agent such as hereinafter described, the furnace blacks may be reduced to pelleted form capable of bulk handling by the conventional method such as described in the previously noted Glaxner patent.

According to this Glaxner process the carbon black is admixed with a restricted amount of water and advanced by stirrer mechanism through a horizontally disposed elongated chamber, and in passing therethrough is subjected to vigorous stirring. Various modifications of the operation described in the Glaxner patent have been proposed, each involving the agitation of the carbon black with water. The present invention is applicable generally to processes of that type as applied to furnace blacks.

In accordance with my present invention a minor proportion of the surface active agent may be premixed with the bulk of water admixed with the black or may be separately introduced, preferably in dilution with water, so as to facilitate uniform dispersion of the surface active agent in the black-water mixture.

The optimum amount of surface active agent used will vary somewhat with the particular surface active agent employed and also with the characteristics of the particular furnace black being pelleted. Usually about 4 parts of a 10% aqueous solution of the surface active agent per 100 parts of furnace black is adequate. Lesser amounts may be used with advantage where high pellet strength is not required, say as low as about 0.1 part per 100 parts of furnace black. More than about 0.5 part per 100 parts of black is generally superfluous, but larger proportions may at times be advantageously used with very fine furnace blacks.

As the surface active agent, I have with particular advantage used the sodium salt of a condensed mono-naphthalene sulfonic acid, such as marketed under the trade name "Ramol PW." Another surface active agent which I have used with particular advantage is the sodium salt of sulfonated naphthalene formaldehyde condensates, such as marketed under the trade name "Tamol R" and also that marketed under the trade name "Darvan." The surface active agents just noted may be generically defined as sodium salts of the aldehyde condensation products of sulfonated naphthalene. Other surface active agents which may be used with advantage include the following:

Sodium alkyl aryl sulphonate, marketed under the trade name "Nacconal NR."
Glucocide mixture of sapotoxin lactosin, quillajac acid, marketed under the trade name "Saponin."
Tannic acid—a product consisting of approximately 65% tannic acid, rest complexes, marketed as "Quebracho Extract-Dry."
Sodium salt of aryl alkyl poly-ether sulphonate, marketed under the trade name "Triton 720."
Long chain fatty acid basic amide, marketed under the trade name "Intracol."
Cetyl dimethyl benzyl ammonium chloride, marketed under the trade name "Triton K-60."
Aryl alkyl poly-ether alcohol, marketed under the trade name "Triton N. E."
Sodium salt of aryl alkyl ether sulphate, marketed under the trade name "Triton W-30."
Dibutyl phenyl phenol sodium disulphonate, marketed under the trade name "Areskelene."
Commercial detergent, marketed under the name "Dreft."
Sodium sulpho lignate, marketed under the trade name "Marasperse C. B."
Magnesium barium lignin sulphonates.

A satisfactory test for determining the bulk handling characteristics of carbon black pellets is the determination of the compression characteristics of the pellets.

A test which has been found to give reliable and consistent results may be carried out in an apparatus consisting of a ¾" i. d. glass tube about 6" long and two brass plungers having platform bases and adapted to slide into either end of the glass tube. In carrying out the test, the lower plunger is inserted in the tube, and, with the tube in an upright position, a 5-gram sample of the dried beads to be tested is placed in the tube. The second plunger is then inserted into the upper end of the tube so as to rest upon the upper surface of the bead sample. It is weighted until a total weight of 25 kilograms is applied, this being equivalent to approximately 125 pounds per square inch. The reduction in height of the bead sample under this weight is determined by measurement of the original and final heights of the column of beads, and is expressed as percentage compressibility.

The results of this test have been found to be a dependable index to the ability of carbon black beads to withstand tank car shipment and bulk handling without loss of their free-flowing characteristics. For satisfactory bulk handling, the compressibility of the beads as determined by the above test should usually be less than about 30, and preferably should be about 25.

The amount of water employed for optimum results by my improved process does not differ substantially from the amount required where my surface active agent is omitted. However, a marked difference in the strength of the resultant pellet is obtained in accordance with my present invention. As is understood in the art, somewhat less water is required for a relatively denser black than is required for a more fluffy black. Further, where the oil content is relatively higher, the use of relatively more water and a longer period of agitation is generally recommended. Likewise, furnace blacks of smaller particle size require larger amounts of water than furnace blacks of larger particle size. It may be, however, that a well densed furnace black of small particle size might require approximately the same amount of water as a less dense black of coarser particle size. Though not an essential of my present invention, it is usually desirable to condense the black by deaerating prior to subjection to the pelleting operation. Blacks thus reduced to a density of about 30 pounds per cubic foot may be used with particular advantage as the required amount of agitation is somewhat reduced.

My invention will be further illustrated by the following specific examples of its application.

*Example I*

A furnace carbon of the type marketed under the trade name "Furnex" was charged to an apparatus of the type disclosed in the Glaxner Reissue Patent 21,379, together with a restricted amount of water containing the surface active agent. For each 100 parts of furnace black, 64 parts of water, to which there had been added .4 part of "Ramol PW," were used.

It is sometimes desirable, though not essential, to use a sharp bladed rotor in the early stage of the operation, as this has a greater tendency to break up any mass of black and liquid which might tend to form lumps.

The mixing chamber, or so-called "bead box," used in this run consisted of two sections, as shown in the previously noted Glaxner patent, situated one above the other, and connected in series, the latter section feeding directly to the drier. The cross-sectional dimension of each box was 14 x 14 inches. The agitator consisted of a series of ½ inch pins attached to a 2⅝ inch shaft, axially positioned in the respective boxes. The length of the shaft between bearings was 10 ft. 7 inches, the overall mixing-agitating length of the chambers being about 21 feet. The speed of the upper agitator was 140 R. P. M., and that of the lower agitator was 145 R. P. M. The clearance between the pins and the inner surface of the box was about 1 inch.

In small scale laboratory apparatus, the operation has been satisfactorily carried out, using the same formula, by uniformly mixing the black with the water containing the surface active agent and vigorously stirring the mass for two minutes using a sharp bladed rotor. This was followed by a vigorous stirring for an additional 5 to 15 minutes, using a rotor with rounded forward edges. Thereafter the black was dried in the conventional manner.

*Example II*

A similar operation was carried out on a laboratory scale, using a furnace black of the type marketed under the trade name "Statex 93" and which had previously been densed by deaeration to a density of about 28 pounds per cubic foot. In this operation, 74 parts of water and 5 parts of a 10% "Ramol PW" solution were used for each 100 parts of black.

In each of the foregoing tests, furnace black pellets having a compressibility of about 25-30%, as determined by the previously described tests, were obtained.

As in conventional operation, the size of the bead may be controlled to a considerable extent by varying the proportion of water added. Frequently the proportion of water added to produce beads of a given size will be slightly less in accordance with my present invention than that normally required in conventional practice.

Further, as in conventional practice in the pelleting of channel black, the strength of the resultant pellets depends to a considerable extent upon the duration of the agitation. The optimum duration of agitation depends somewhat upon the characteristics of the particular black. It will be understood that the agitation should be continued until the particles of black have been formed into solid compact beads.

I claim:

1. In the process for producing substantially dry pellets of furnace black wherein the furnace black is mixed with an amount of water not exceeding the weight of the black, the mixture agitated to form the moist black into pellets and the pellets dried, the step of including in the furnace black-water mixture a minor proportion of a surface active agent of the group consisting of the sodium salts of the aldehyde condensation products of sulfonated naphthalene, the sodium alkyl aryl sulfonates, the sodium salts of aryl alkyl poly-ether sulfonates, the sodium salts of aryl alkyl ether sulfates, sodium lauryl sulfate, the dibutyl phenyl phenol sodium disulfonates, the sodium sulfo lignates, the magnesium barium lignin sulfonates, the long chain fatty acid basic amides, cetyl dimethyl benzyl ammonium chloride, the aryl alkyl poly-ether alcohols, tannic acid and glucocide mixtures of sapotoxin lactosin and quillajac acid, the proportion of the surface active agent so included being within the range of 0.1 to 0.5 parts per 100 parts of the black, by weight.

2. The process of claim 1 in which the surface active agent is a sodium salt of an aldehyde condensation product of sulfonated naphthalene.

3. The process of claim 1 in which the surface active agent is a sodium alkyl aryl sulfonate.

4. The process of claim 1 in which the surface active agent used is a sodium sulfo lignate.

5. The process of claim 1 in which the surface active agent is a sodium salt of an aryl alkyl poly-ether sulfonate.

6. The process of claim 1 in which the surface active agent is tannic acid.

LOUIS JOSEPH VENUTO.

References Cited in the file of this patent

UNITED STATES PATENTS

| Number | Name | Date |
|---|---|---|
| Re. 21,379 | Glaxner | Mar. 5, 1940 |
| 1,889,429 | Weigand et al. | Nov. 29, 1932 |
| 2,121,535 | Amon | June 21, 1938 |
| 2,131,686 | Heller et al. | Sept. 27, 1938 |
| 2,221,175 | Bechtold | Nov. 12, 1940 |
| 2,457,962 | Whaley | Jan. 4, 1949 |
| 2,503,361 | Studebaker | Apr. 11, 1950 |

FOREIGN PATENTS

| Number | Country | Date |
|---|---|---|
| 429,088 | Great Britain | May 23, 1935 |

OTHER REFERENCES

Lehner, "Chemical Industries," March 1941 pages 324-326.